Nov. 16, 1948.                W. H. KLIEVER                2,454,184
                            TELEMETRIC COMPASS
                            Filed Aug. 20, 1947
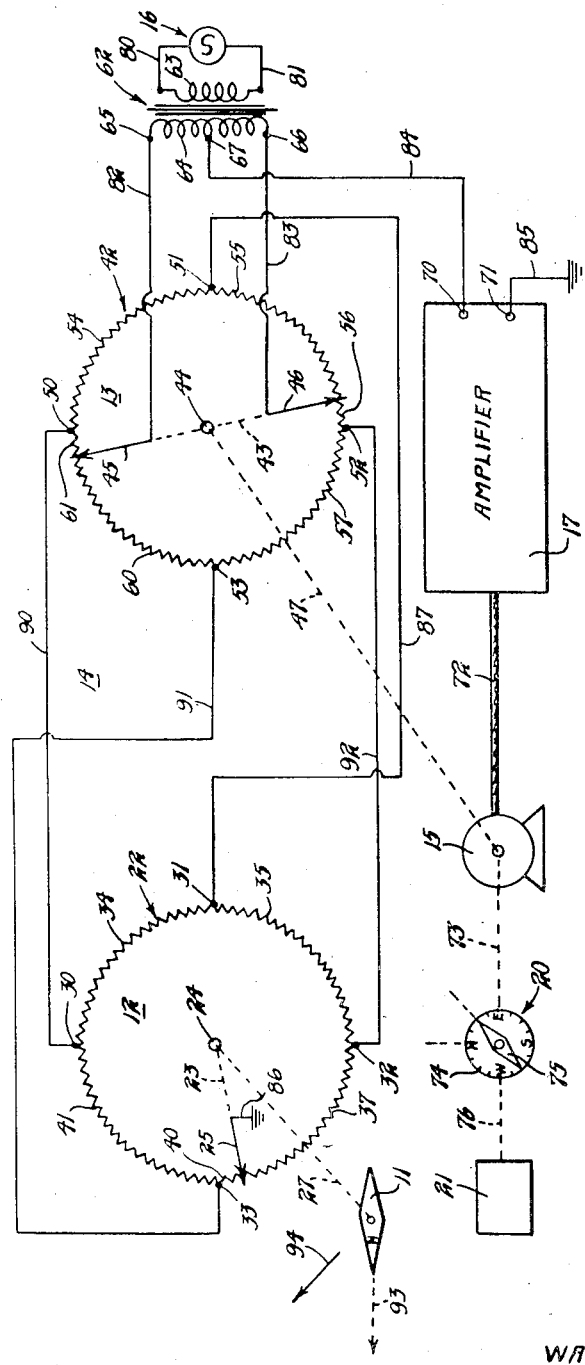
Inventor
WALDO H. KLIEVER
George H. Fisher
Attorney Patented Nov. 16, 1948

2,454,184

UNITED STATES PATENT OFFICE 2,454,184

TELEMETRIC COMPASS

Waldo H. Kliever, Minneapolis, Minn., assignor to Minneapolis-Honeywell Regulator Company, Minneapolis, Minn., a corporation of Delaware Application August 20, 1947, Serial No. 769,757

12 Claims. (Cl. 318—29)

This invention relates to the field of aeronautical instruments, and more particularly to telemetric compasses in which the indicating or control function which the instrument is to perform is accomplished at a point remote from the location of the actual field-sensing element.

It is a broad object of the invention to provide an improved telemetric compass.

A more specific object of the invention is to provide a telemetric compass in which wiring is simplified by reducing the number of leads required by the telemetric transmitter.

It is a further object of the invention to provide a telemetric compass in which a grounded connection to a single slider on one of the telemetric units and a center tap on the source of electrical energy comprise the input to the receiver motor control.

It is a still further object of the invention to provide a telemetric compass in which the load on the magnetic needle is reduced by reducing the number of frictional forces reacting against the torque of the needle.

Another object of the invention is to provide a telemetric compass in which the load on the needle is minimized by the absence of any flexible leads or collector brushes connected therewith.

Various other objects, advantages, and features of novelty which characterize the invention are pointed out with particularity in the claims annexed hereto and forming a part hereof. However, for a better understanding of the invention, its advantages, and objects obtained by its use, reference should be had to the subjoined drawing, which forms a further part hereof, and to the accompanying descriptive matter, in which there is illustrated and described a preferred embodiment of the invention.

The single figure of the drawing is a schematic showing of a telemetric compass constructed according to the invention.

In the drawing, a magnetic needle 11 is shown as controlling the position of the movable member of a transmitter or first endless variable resistor 12, spaced points on the winding of which are connected by means of a harness 14 to similarly spaced points on the winding of a receiver or second endless variable resistor 13. The movable member of resistor 13 is shown as actuated by a motor 15, and as energized from a suitable source of electrical energy 16. Motor 15 is shown as energized from an amplifier 17 and as actuating an indicator 20 and a controller 21. Whenever the movable members of the variable resistors are not in properly related positions with respect to their windings, an input voltage is applied to amplifier 17, causing operation of motor 15 in a direction to place the movable member of resistor 13 in the proper position, and at the same time to actuate indicator 20 and controller 21. The device will now be considered in further detail, as applied to an aircraft.

Transmitter 12 is shown to comprise a uniform circular winding 22 which is insulatingly supported for movement unitary with a craft, by any suitable means not shown. A movable member 23 is pivotally mounted as at 24 and carries a tap or sliding contact 25 so that the slider may take any desired angular position around pivot 24, maintaining continuous electrical contact with winding 22 and movable therealong by reason of a mechanical connection 27 to magnetic needle 11. In addition to movable tap 25, winding 22 is provided with fixed taps 30, 31, 32 and 33 so that the winding is divided into a number of portions which for convenience in later reference will be identified by the reference numerals 34, 35, 37, 40 and 41.

Receiver 13 is constructed in the same general fashion. It is shown to comprise a uniform endless winding 42 fixed to and insulated from the craft, and a movable member 43 pivoted about a central point 44 and including taps 45 and 46. Winding 42 is divided by fixed taps 50, 51, 52 and 53 and movable taps 45 and 46 into a plurality of sections which for convenience and future reference are identified by the reference numerals 54, 55, 56, 57, 60 and 61. A suitable mechanical connection 47 makes it possible for motor 15 to control the position of movable member 43 just as needle 11 controls the position of movable member 23.

The system thus far described is energized from source 16 of alternating voltage of a suitable frequency through a transformer 62 comprising a primary winding 63 and a secondary winding 64 having end terminals 65 and 66 and an intermediate terminal or center tap 67, with respect to which the end terminals are at opposite potentials. As used in the appended claims, the expression "a source of electrical energy" refers to secondary winding 64 of transformer 62.

Amplifier 17 is shown to comprise a pair of input terminals 70 and 71, and to energize motor 15 through an output cable 72. Amplifier 17 may be of any suitable type in which a motor is controlled for operation in a forward or reverse direction as the phase of the input voltage of the amplifier reverses, and may be energized independently from source 16. A necessary characteristic of the amplifier is that its input resistance be so high as to reduce to a negligible value the current flowing in the input circuit.

Indicator 20 is actuated by motor 15 through a mechanical connection 73, which may include suitable reduction gearing if desired, and is shown to comprise a graduated scale 74 and an index 75 movable with respect thereto. Scale 74 may be a conventional compass rose, since its purpose is to make the direction taken by magnetic needle 11 known at a spot remote from the needle.

Control member 21 is shown as actuated by a mechanical connection 76 forming a continuation of connection 73. Member 21 may be a control member for an automatic pilot, a mechanical input to a computer, or any other desired means for taking advantage of the torque amplifying properties of this system in repeating the indication of the magnetic needle.

Wiring

Primary winding 63 of transformer 62 is energized from source 16 through conductors 80 and 81. Sliding contacts 45 and 46 are energized from the end terminals 65 and 66 of secondary winding 64 through conductors 82 and 83, respectively. Center tap 67 of secondary winding 64 is connected with input terminal 70 of amplifier 17 by conductor 84. Terminal 71 of amplifier 70 is grounded as at 85, and sliding contact 25 of variable resistor 12 is grounded as at 86.

Harness 14 interconnecting the windings of the two variable resistors is shown to comprise conductor 87 connecting tap 31 on variable resistor 12 with tap 51 on variable resistor 13, conductor 90 connecting tap 30 on variable resistor 12 with tap 50 on variable resistor 13, conductor 91 connecting tap 33 on variable resistor 12 with tap 53 on variable resistor 13, and conductor 92 connecting tap 32 on variable resistor 12 with tap 52 on variable resistor 13.

Operation

The operation of my invention will most easily be understood by the consideration of specific cases. Suppose that the output voltage of secondary winding 64 is 20 volts at a particular point in the cycle of the source, that slider 25 is displaced counter-clockwise from tap 33 by 18° while sliders 45 and 46 are displaced counter-clockwise from taps 50 and 52, respectively by 9°, and that the resistance between terminals 70 and 71 is infinitely high. The following voltage relations prevail, all potentials being taken with respect to center tap 67 of secondary winding 64. Terminal 65 and slider 45 have a potential of plus 10 volts: terminal 66 and slider 46 have a potential of minus 10 volts. A voltage of 20 volts is applied across a pair of voltage dividers—61, 54, 55 and 60, 57, 56, and since the windings are uniform the voltage gradient is also uniform. The voltage drop between slider 45 and tap 50 is 9/180 of the total voltage and so is that between slider 46 and tap 52: the potentials of taps 50 and 52 are therefore plus 9 volts and minus 9 volts respectively. The voltage drop between slider 45 and tap 53 is 81/180 of the total voltage drop and so is that between slider 46 and tap 51: the potentials of taps 53 and 51 are therefor plus one volt and minus one volt respectively.

From the foregoing it is apparent that conductors 87, 90, 91 and 92 function to impress potentials on the taps of resistor 12 as follows: tap 30, plus 9 volts; tap 31 minus 1 volt; tap 32 minus 9 volts; tap 33 plus 1 volt. Windings 40 and 37 comprise a voltage divider having a uniform voltage gradient, and a total applied voltage of 10 volts. The voltage drop between tap 33 and slider 25 is 18/180 of the total voltage; the potential of slider 25 is therefor minus 1 volt, and a signal of 1 volt amplitude is impressed on amplifier 17 in such a phase that the grounded terminal is negative at the selected point in the cycle.

Amplifier 17 is so connected to motor 15 that when a signal of this phase is impressed on the amplifier, the motor operates in a direction to rotate member 43 counter-clockwise. This causes the absolute magnitudes of the voltages of taps 50, 30, 52 and 32 to decrease and those of taps 51, 31, 53 and 33 to increase. When this has continued until sliders 45 and 46 are displaced counter-clockwise from taps 50 and 52 by 18°, the voltage relations are as follows: taps 50 and 30, plus 8 volts; taps 52 and 32, minus 8 volts; taps 51 and 31, minus 2 volts; taps 53 and 33, plus 2 volts; slider 25, 0 volts. Both input terminals of the amplifier are now at the same potential and energization of motor 15 is interrupted. This is the balance condition of the system.

Suppose now that, instead of the angular relationship first defined for member 43, this member is originally so located that sliders 45 and 46 are displaced clockwise from taps 50 and 52 by 27°, other conditions remaining unchanged. The voltage relations are now as follows: slider 45, plus 10 volts; slider 46, minus 10 volts; taps 50 and 30, plus 7 volts; taps 52 and 32, minus 7 volts; taps 51 and 31, plus 3 volts; taps 53 and 33, minus 3 volts; slider 25, plus 1 volt. A signal of 1 volt amplitude is again impressed on amplifier 113, but this time in such a phase that the grounded terminal is positive at the selected point in the cycle. Motor 15 is this time energized to run a direction to rotate member 43 clockwise, and this continues until the balance condition is again reached.

The foregoing operation of the instrument is that normally taking place when it is energized after an interval of non-use: motor 15 aligns member 43 with member 23, and this in turn brings indicator 7 into a previously coordinated relationship with needle 11, in which index 75 shows on scale 74 the actual direction taken by needle 11 in aligning itself with true north as represented in the drawing by the dotted arrow 93.

Needle 11 and slider 25 are mounted for free rotation with respect to the vehicle in which the system is mounted, and as the heading of the vehicle changes, the windings of transmitter 12 move with respect to slider 25, which is maintained aligned with magnetic north. When the instrument is first installed the above procedure is followed, and after the system comes to balance, index 75 is set at the north graduation of scale 74: the actual position of slider 25 on its windings is of course immaterial. This condition is that illustrated.

Suppose now that the heading of the craft changes to a new direction adjusted by the solid arrow 94 in the drawing, the magnitude of the change being for example 18° to the east of the position at which balance was previously attained. This means that the winding of transmitter 12 rotates clockwise with respect to slider 25 so that the slider is now actually displaced clockwise from tap 33 by 36°. The voltage relations at the previous balance condition were: taps 50 and 30, plus 8 volts; taps 52 and 32 minus 8 volts; taps 51 and 31 minus 2 volts;

taps 53 and 33, plus 2 volts. The new position of slider 25 is such that its potential is now minus 2 volts, and amplifier 17 energizes motor 15 to operate in a direction to rotate member 43 counter-clockwise; at the same time the motor rotates index 75 clockwise with respect to scale 74. The mechanical connections are so chosen that when the balance condition of the electrical system is reached index 75 indicates 18° east of north on scale 74.

The system disclosed above has an advantage over systems known in the art, first because of the simplicity of the interconnecting system between the transmitter and the receiver. Not only is the number of wires reduced from 6 to 5, by the use of the frame of the craft as a conductor coöperating with ground connections 85 and 86, but the structure of transmitter 12 is greatly simplified since slider 25 no longer need be insulated from shaft 24. This is true regardless of which of members 23 and 43 is actuated by the condition responsive means and which by the rebalancing means.

An additional advantage is derived from the arrangement, when, as shown, the condition responsive means is connected to member 23. Here the absence of collector rings or pig-tail connections and the presence of only the single sliding contacts on the resistance member greatly reduce the frictional load on the magnetic needle and therefor increase the sensitivity of the whole system. A further advantage for this arrangement is to be found in the fact that a smaller number of electrical conductors are brought into proximity with the field sensing member.

Numerous objects and advantages of the invention have been set forth in the foregoing description together with the details of the structure and function of the invention, and the novel features thereof have been clearly disclosed. The disclosure, however, is illustrative only, and changes may be made in detail, especially in matters of shape, size and arrangement of parts, within the principle of the invention, to the full extent indicated by the broad general meaning of the term in which the appended claims are expressed.

I claim as my invention:

1. Control apparatus comprising, in combination: a pair of endless impedance members electrically connected together at a plurality of corresponding points; tap means for adjustably introducing a voltage between two spaced points of one of said members; tap means adjustably engaging the other of said members; means adjusting one of said tap means in response to a condition; and means responsive to the signal voltage between said second named tap means and a point at a potential fixed with respect to those of said two spaced points.

2. Control apparatus comprising, in combination: a pair of endless impedance members electrically connected together at a plurality of corresponding points; tap means for adjustably introducing a voltage between two spaced points of one of said members; tap means adjustably engaging the other of said members; means adjusting one of said tap means in response to a condition; means responsive to the signal voltage between said second named tap means and a point at a potential fixed with respect to those of said two spaced points, and means actuated by said responsive means for adjusting the other of said tap means to reduce said signal voltage to zero.

3. A control system of the class described comprising, in combination: a plurality of endless impedance members; means interconecting corresponding points along said impedance members; tap means making contact with one of said members at a number of points; tap means making connection with another of said members at a single point; a source of electrical energy having an intermediate tap; means connecting said source to said first named tap means so as to energize said one member; a motor; means actuated by said motor for varying the relative positions of one of said members and one of said tap means; condition responsive means for varying the relative positions of another of said members and the other of said tap means; motor control means including connections to said second named tap means and said intermediate tap and actuated upon lack of angular agreement between said first and second named relative positions to energize said motor for adjusting said first named relative position to restore said agreement; and controlled means actuated by operation of said motor.

4. A control system of the class described comprising, in combination: a plurality of insulated endless impedance members; means interconnecting corresponding points along said impedance members; tap means making contact with one of said members at a number of points; grounded tap means making connection with another of said members at a single point; a source of electrical energy having an intermediate tap; means connecting said source to said first named tap means so as to energize said one member; a motor; means actuated by said motor for varying the relative positions of one of said members and one of said tap means; condition responsive means for varying the relative positions of another of said members and the other of said tap means; motor control means, including a ground connection and a connection to said intermediate tap, actuated upon lack of angular agreement between said first and second named relative positions to energize said motor for adjusting said first named relative position to restore said agreement; and controlled means actuated by operation of said motor.

5. A control system of the class described comprising, in combination: first and second endless impedance members; fixed taps at corresponding locations along said members; means making electrical connection between corresponding taps on said members; a source of electrical energy having an intermediate tap; means movable along one of said impedance members to variably energize said member from said source; a motor; means connecting said motor to move said last named means; a contact movable along the other of said impedance members to make electrical connection therewith; means moving said contact in accordance with a condition; means including connections to said intermediate tap and said second named tap means, energizing said motor in accordance with the relationship of the position of said contact on said second member to the position of said movable means on said first member; and controlled means actuated by said motor.

6. A control system of the class described comprising, in combination: first and second insulated endless impedance members; fixed taps at corresponding locations along said members; means making electrical connection between corresponding taps on said members; a source of electrical energy having an intermediate tap; means movable along one of said impedance members to energize said member from said source; a motor; means connecting said motor to move said last named means; a grounded contact movable along the other of said impedance members to make electrical connection therewith; means moving said contact in accordance with a condition; means, including a ground connection and a connection to said intermediate tap, energizing said motor in accordance with the relationship of the position of said contact on said second member to the position of said movable means on said first member; and controlled means actuated by said motor.

7. A control system of the class described comprising, in combination: a pair of circular impedance members having taps in the same mutual angular relationship; means interconnecting the related taps on said members; a pair of opposite sliders movable with respect to one of said members; a source of electrical energy having an intermediate terminal and a pair of terminals maintained at opposite potentials with respect thereto; means connecting said pair of terminals to said pair of sliders; a slider movable with respect to the other of said members; a motor; means coupling said motor to drive said pair of sliders; condition responsive means; means coupling said condition responsive means to drive said single slider; and means, including connections to said single slider and said intermediate terminal, to control operation of said motor.

8. A control system of the class described comprising, in combination: a pair of circular impedance members having taps in the same mutual angular relationship; means interconnecting the related taps on said members; a pair of opposite sliders movable with respect to one of said members; a source of electrical energy having an intermediate terminal and a pair of terminals maintained at opposite potentials with respect thereto; means connecting said pair of terminals to said pair of sliders; a single slider movable with respect to the other of said members; a motor; means coupling said motor to drive said pair of sliders; condition responsive means; means coupling said condition responsive means to drive said single slider; motor control means for controlling energization of said motor; and means, including connections to said single slider and said intermediate terminal, for actuating said motor control means.

9. A control system of the class described comprising, in combination: a pair of insulated circular impedance members having taps in the same mutual angular relationship; means interconnecting the related taps on said members; a pair of opposite sliders movable with respect to one of said members; a source of electrical energy having an intermediate terminal and a pair of terminals maintained at opposite potentials with respect thereto; means connecting said pair of terminals to said pair of sliders; a grounded slider movable with respect to the other of said members; a motor; means coupling said motor to drive said pair of sliders; condition responsive means; means coupling said condition responsive means to drive said single slider; and means, including a connection to said intermediate terminal, for causing operation of said motor whenever the positions, with reference to the respective impedance members, of said grounded slider and said pair of sliders are out of a predetermined interrelationship.

10. An instrument of the class described comprising, in combination: a pair of circular resistance windings having taps in the same mutual angular relationship; means interconnecting the related taps on said members; a pair of diametrically opposed contacts unitarily slidable with respect to one of said windings; a transformer having a secondary winding including end terminals and a center tap; means connecting said end terminals to said contacts; a contact slidable with respect to the other of said resistance windings; means rotatively responsive to the earth's magnetic field; means connecting said last named means in driving relation to said single contact; a motor; a controlled device; means coupling said motor in driving relation to said controlled device and said pair of contacts for controlling the same; and means, including connections to said contact and said center tap, for controlling operation of said motor in accordance with voltages appearing between said last named connections.

11. An instrument of the class described comprising, in combination: a pair of circular resistance windings having taps in the same mutual angular relationship; means interconnecting the related taps on said members; a pair of diametrically opposed contacts unitarily slidable with respect to one of said windings; a transformer having a secondary winding including end terminals and a center tap; means connecting said end terminals to said contacts; a second contact slidable with respect to the other of said resistance windings; means rotatively responsive to the earth's magnetic field; means connecting said last named means in driving relation to said single contact; a motor; a controlled device; means coupling said motor in driving relation to said controlled device and said pair of contacts for controlling the same; a motor control amplifier connected in controlling relation to said motor; and means impressing upon said amplifier the voltage between said contact and said center tap due to different displacements of said single contact and said pair of contacts with respect to their related windings.

12. An instrument of the class described comprising, in combination: a pair of insulated circular resistance windings having taps in the same mutual angular relationship; means interconnecting the related taps on said members; a pair of diametrically opposed contacts unitarily slidable with respect to one of said windings; a transformer having a secondary winding including end terminals and a center tap; means connecting said end terminals to said contacts; a grounded contact slidable with respect to the other of said resistance windings; means rotatively responsive to the earth's magnetic field; means connecting said last named means in driving relation to said single contact; a motor; a controlled device; means coupling said motor in driving relation to said controlled device and said pair of contacts for controlling the same; and means, including a ground connection and a connection to said center tap, to control operation of said motor in accordance with voltages appearing between said last named connections.

WALDO H. KLIEVER.

REFERENCES CITED

The following references are of record in the file of this patent:

UNITED STATES PATENTS

| Number | Name | Date |
| --- | --- | --- |
| 1,768,966 | Tanner | July 1, 1930 |